(12) United States Patent
Kulkarni et al.

(10) Patent No.: US 8,917,464 B2
(45) Date of Patent: Dec. 23, 2014

(54) UTILIZATION OF DISK BUFFER FOR BACKGROUND REPLICATION PROCESSES

(71) Applicant: International Business Machines Corporation, Armonk, NY (US)

(72) Inventors: Janmejay S. Kulkarni, Navi Mumbai (IN); Sapan J. Maniyar, Pune (IN); Sarvesh S. Patel, Nasik (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/733,323

(22) Filed: Jan. 3, 2013

(65) Prior Publication Data

US 2014/0185157 A1    Jul. 3, 2014

(51) Int. Cl.
*G11B 5/86*  (2006.01)
*G06F 12/02* (2006.01)

(52) U.S. Cl.
CPC . *G11B 5/86* (2013.01); *G06F 12/02* (2013.01)

USPC .................. 360/15; 360/48; 360/54; 360/55

(58) Field of Classification Search
None
See application file for complete search history.

(56) References Cited

U.S. PATENT DOCUMENTS

| 7,324,415 | B2 * | 1/2008 | Fontijn ..................... 369/47.15 |
| 7,469,095 | B1 * | 12/2008 | Lin ............................. 386/263 |
| 2006/0123483 | A1 * | 6/2006 | Cohen ........................... 726/26 |
| 2006/0143412 | A1 | 6/2006 | Armangau |

\* cited by examiner

*Primary Examiner* — Muhammad N Edun
(74) *Attorney, Agent, or Firm* — Jason H. Sosa; John W. Hayes

(57) ABSTRACT

Embodiments of the present invention utilize a hard disk drive buffer to minimize seek delays during background replication of a first volume and fulfillment of application input/output requests. According to one aspect of the present invention, a requested first sector of data is read along with one or more additional sectors of data. Upon determining that one or more of the read sectors of data should be replicated, the sectors are read from the disk buffer and written to a second volume.

25 Claims, 5 Drawing Sheets

UTILIZATION OF DISK BUFFER FOR BACKGROUND REPLICATION PROCESSES

FIELD OF THE INVENTION

The present invention relates generally to storage devices and, more particularly, to utilizing a disk buffer to improve the performance of background replication processes.

BACKGROUND

Presently, hard disk drives are one of the more commonly used forms of electronic data storage devices. Hard disk drives contain one or more magnetic disks ("platters") which serve as the storage media. Each platter includes a plurality of concentric circular tracks on its surfaces, and each platter is divided into geometrical sectors. The intersections of the geometrical sectors and the concentric circular tracks define data sectors, which typically consist of 512 bytes of data storage space each. Magnetic heads move into position over the appropriate tracks (i.e., seeking) and, as the platters rotate beneath, the magnetic heads write data to one or more sectors on those tracks as a series of magnetic polarity transitions. The magnetic heads can also read stored data by detecting these magnetic polarity transitions (or the absence thereof).

Hard disk drives typically include a disk buffer, which is an embedded memory that helps increase performance. For example, when a request is received for one or more sectors of data, there is a reasonable likelihood that subsequent requests will be made for data in the sectors located before and after the requested data on the same track. Storing that data in the disk buffer therefore helps increase performance, as the request and subsequent requests for the data are fulfilled from the disk buffer rather than requiring additional seeking and reads from the platters.

A storage controller manages multiple hard disk drives and can present the hard disk drives to a computer as one or more logical volumes. For example, a storage controller can receive application requests to write data to a particular volume and, based on the geometry of the platters (e.g., track density, sector size, etc.), the storage controller can instruct the appropriate hard disk drive to write the data in the appropriate sectors.

Storage controllers typically have the ability to replicate volumes in the background while still fulfilling input and output (I/O) requests made by applications. A typical replication process involves sequentially reading sectors from a first volume (i.e., on a first hard disk drive) and writing those sectors to a second volume (i.e., on a second hard disk drive). Such replication processes can involve considerable head movement between different tracks of the hard disk drive, resulting in seek delays that can affect the performance of both the replication process and the fulfillment of application I/O requests.

SUMMARY

According to one aspect of the present invention, there is provided a method for replicating data from a first volume to a second volume on a hard disk drive comprising receiving a first data request comprising a request for at least a first sector on a first track of a hard disk drive, wherein the first sector is part of a first volume; reading data requested in the first data request, and reading at least a second sector of the first track, in addition to data in the first data request; determining whether the second sector should be replicated to a second volume; and in response to determining that the second sector should be replicated to the second volume, writing the second sector to the second volume.

DETAILED DESCRIPTION

Figure 1:
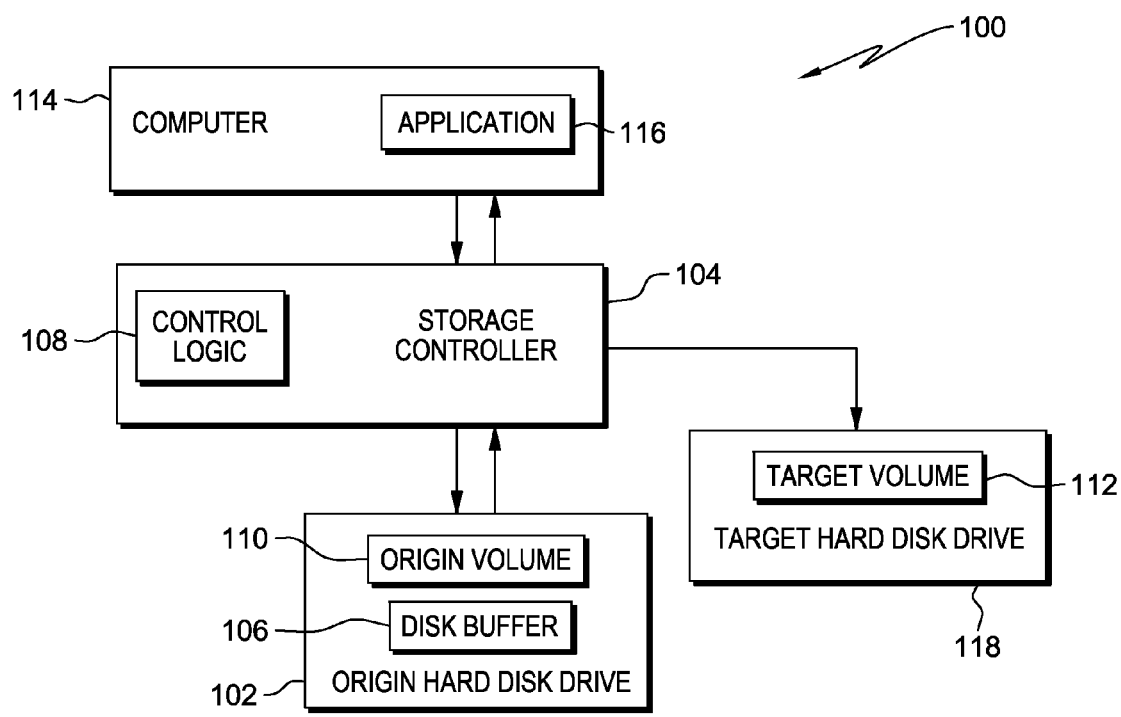
FIG. 1 is a block and data flow diagram of a hard disk drive environment in accordance with an exemplary embodiment of the present invention.

Existing methods for a background replication process can interfere with application input/output (I/O) requests due to random head movement caused by READ requests generated by interleaved background copying and application I/O. Embodiments of the present invention recognize that under heavy load application I/O load scenarios, background copy rate is typically throttled down to reduce interfering with application I/O performance. This causes the background copy process to be prolonged and hence leads to unavailability of an in-sync replica for longer periods of time. Embodiments of the present invention exploit application I/O without introducing expensive overhead and prevent the need to throttle down background copy rates during heavy application I/O load conditions.

Embodiments of the present invention disclose a method, computer program product, and computer system for accelerating a background replication process on storage devices during application input/output requests. More specifically, when a background replication process finds itself in competition with application I/O, embodiments of the present invention allow the background replication process to utilize the reads being performed by the application I/O and avoid duplicitous reads and time spent seeking data on discrete tracks. For example, embodiments of the present invention may fulfill READ requests issued by the background copy process from the disk buffer, thereby eliminating the need to read data from actual disk platters, on which the requested data is located on, and any corresponding disk arm movement.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the figures. FIG. 1 illustrates a hard disk drive environment, generally designated 100, according to one embodiment of the present invention.

Hard disk drive environment 100 includes origin hard disk drive 102, target hard disk drive 118, storage controller 104, and computer 114. Origin hard disk drive 102 and target hard disk drive 118 can be, for example, Advanced Technology Attachment (ATA), Serial ATA (SATA), Small Computer System Interface (SCSI), or Serial Attached SCSI (SAS) compatible hard disk drives. Origin hard disk drive 102 and target hard disk drive 118 can be connected internally (i.e., an internal hard disk drive) or externally (i.e., an external hard disk drive) to computer 114. Computer 114 may be, for example, a desktop computer, a laptop computer, a tablet computer, a mobile computer device, or any other computer system known in the art.

Origin hard disk drive 102 includes disk buffer 106 and origin volume 110 connected to storage controller 104 which contains control logic 108. Also connected to storage controller 104 is target hard disk drive 118 which includes target volume 112. Storage controller 104 manages the transfer of data between origin hard disk drive 102, target hard disk drive 118 and computer 114. Storage controller 104 may be, for example, a disk array controller or any storage virtualization device (e.g., SAN Volume Controller). Control logic 108 provides control for performing an accelerated background replication process in accordance with embodiments of the present invention. Control logic 108 can be implemented, for example, with one or more electrical circuits (e.g., a plurality of hardware logic gates), firmware, and combinations of both.

A "background replication process," as used in this specification, refers generally to the process of replicating origin volume 110 to target volume 112, while also fulfilling application I/O requests made by application 116. Origin volume 110 and target volume 112 can each consist of one or more sectors located on one or more tracks of origin hard disk drive 102 and target hard disk drive 118, respectively.

Disk buffer 106 is an embedded memory that stores data that is read from the platters (e.g., fulfilling an application READ request), as well as data that is to be written on the platters (e.g., fulfilling an application WRITE request). Data that is stored in disk buffer 106 can be accessed without seeking and seek delays.

It should be understood that, for illustrative purposes, FIG. 1 does not include other elements which may be present when implementing embodiments of the present invention, such as additional logic and components on storage controller 104 to perform additional processes. Additionally, many storage systems contain arrays of hard disk drives, and logical volumes may actually span a plurality of such disk drives. For example, origin volume 110 may, in one embodiment, actually span both origin hard disk drive 102 and a second hard disk drive.

Figure 2:
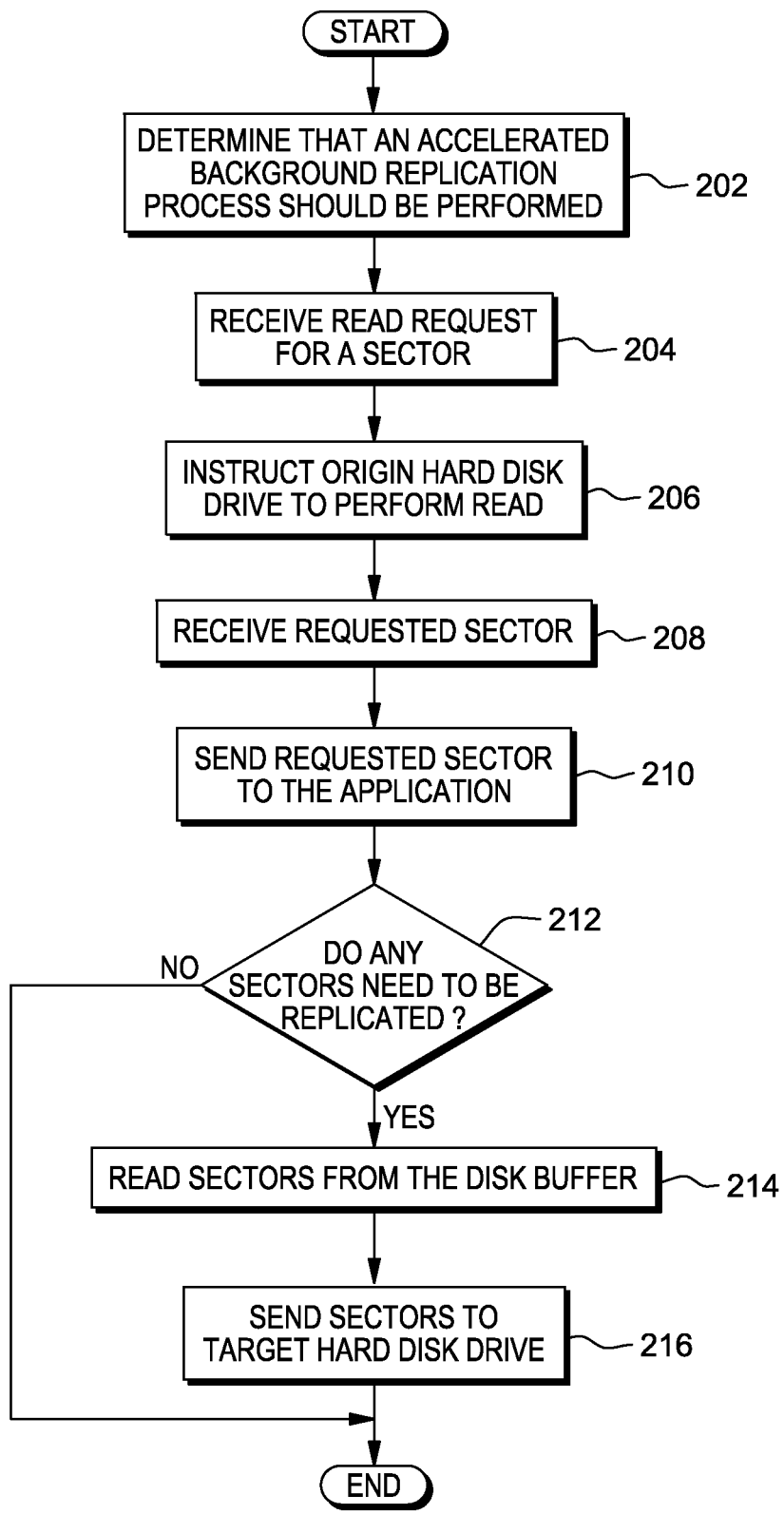
FIG. 2 is a flowchart illustrating operational steps of control logic for performing an accelerated background replication process in accordance with an exemplary embodiment of the present invention.

FIG. 2 is a flowchart illustrating operational steps of control logic 108 for performing an accelerated background replication process in accordance with an embodiment of the present invention. In this exemplary embodiment, origin volume 110 located on origin hard disk drive 102 is being replicated to target volume 112 located on target hard disk drive 118 as a background process to fulfilling a READ request from application 116. For illustrative purposes, the READ request of this exemplary embodiment pertains to a single sector.

Control logic 108 determines that an accelerated background replication process should be performed (step 202). In this exemplary embodiment, control logic 108 determines that the accelerated background replication process should be performed by determining that the rate of data replication has fallen below a specified threshold. The rate of data replication may be calculated as the amount of data (e.g., in megabytes) replicated from origin volume 110 to target volume 112 over the total elapsed time of the replication process (e.g., in seconds). Responsive to the rate of data replication being equal to or above the specified threshold, a sequential background replication process is instead performed by sequentially reading sectors from origin volume 110 and copying those sectors to target volume 112. In another embodiment, responsive to the rate of data sent to fulfill a READ request from application 116 being less than a specified threshold, a sequential background replication process is instead performed by sequentially reading sectors from origin volume 110 and copying those sectors to target volume 112.

Control logic 108 receives a READ request from application 116 for data located in a sector ("requested sector") of origin hard disk drive 102 (step 204). Origin hard disk drive 102 is aware of disk geometry information such as sector and track information through the use of small computer system interface (SCSI) commands. In an embodiment where data is stored on an array of hard disk drives, such as in a RAID configuration, a RAID controller can provide the disk geometry through SCSI commands. Based on the geometry of origin hard disk drive 102, control logic 108 instructs origin hard disk drive 102 to perform a READ by moving (i.e., seeking) the appropriate magnetic head to the track on which the requested sector is located, reading the requested sector, as well as sectors that precede and are subsequent to the requested sector, and storing those sectors in disk buffer 106 (step 206). The number of preceding and subsequent sectors that are read and stored in disk buffer 106 depends on the configuration of origin hard disk drive 102. Further, since platters of origin hard disk drive 102 rotate at constant speed and outer tracks typically contain more sectors than inner tracks, the number of preceding and subsequent sectors that are read and stored in disk buffer 106 can depend on the track on which the requested data is located.

Control logic 108 receives the requested sector from origin hard disk drive 102 (step 208). After receiving the requested sector, control logic 108 sends the requested sector to application 116 to fulfill the READ request (step 210). Control logic 108 then determines whether any of the preceding, requested, and subsequent sectors that were read and stored in disk buffer 106 in step 206 should be replicated for the background replication process (step 212). Due to the single rotation direction of the disk platter, preceding sectors represents the sectors located before the requested sector on the same track and subsequent sectors represents the sectors located after the requested sector on the same track. In this exemplary embodiment, control logic 108 determines whether any of these sectors are located in origin volume 110 and have not yet been copied to target volume 112.

Responsive to determining that one or more of the preceding, requested, or subsequent sectors should be replicated (yes branch, step 212), control logic 108 reads the sectors in need of replication from disk buffer 106 (step 214) and sends the sectors to target hard disk drive 118 to be written to target volume 112 (step 216).

Accordingly, in this exemplary embodiment, disk buffer 106 is utilized to reduce the seek delay that is experienced when a request for data coincides with data that needs to be replicated during a background replication process. Sectors of data that surround a requested sector, and may need to be replicated to target volume 112, are read and stored in disk buffer 106 during a read of the requested data sector, thereby avoiding additional seek delays. Further, when writing the sectors of data to target volume 112, the sectors of data are read from disk buffer 106, which again avoids additional seek delays. Eliminating additional seek delays helps increase performance of the background replication process and the fulfillment of application I/O requests.

Figure 3:
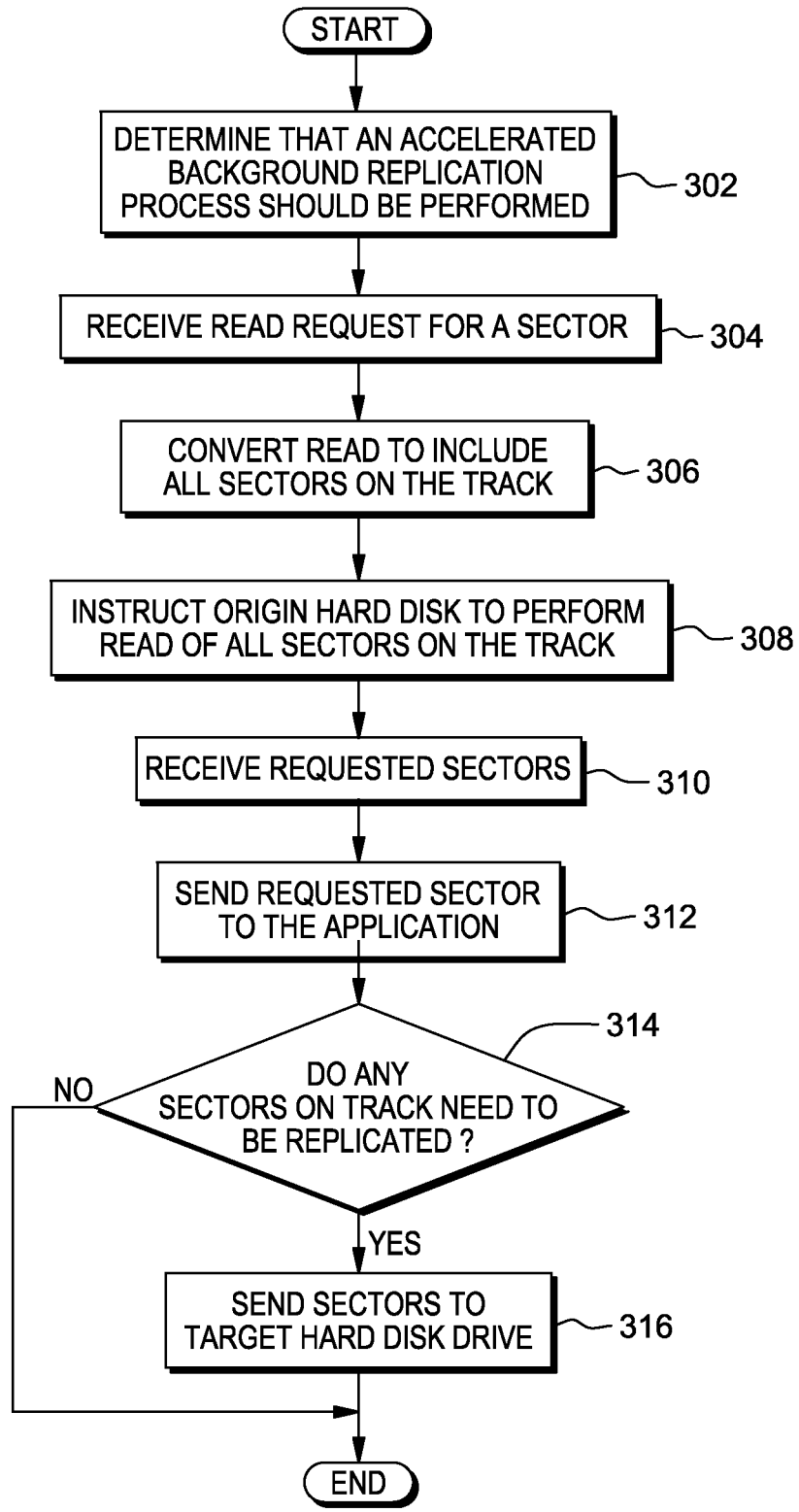
FIG. 3 is a flowchart illustrating operational steps of control logic for performing an accelerated background replication process in accordance with another exemplary embodiment of the present invention.

FIG. 3 is a flowchart illustrating operational steps of control logic 108 for accelerating a background replication process in accordance with another embodiment of the present invention. In this exemplary embodiment, origin volume 110 located on origin hard disk drive 102 is being replicated to target volume 112 located on target hard disk drive 118 as a background process to fulfilling a READ request from application 116.

Control logic 108 determines that an accelerated background replication process should be performed (step 302). In this exemplary embodiment, control logic 108 determines that the rate of data replication has fallen below a specified threshold, as previously discussed with regard to FIG. 2. Storage controller 104 receives a READ request from application 116 for data located in a sector ("requested sector") on a track of origin hard disk drive 102 (step 304). Control logic 108 converts the READ request from application 116 to include data located in all of the sectors on the track on which the requested sector is located (step 306).

Based on the known geometry of origin hard disk drive 102, control logic 108 then instructs origin hard disk drive 102 to perform a READ by moving (i.e. seeking) the appropriate magnetic head to the track on which the requested sector is located and reading all sectors on the track (step 308). Control logic 108 receives the sectors on the track from origin hard disk drive 102 (step 310) and sends the requested sector to application 116 to fulfill the READ request (step 312). Control logic 108 then determines whether any of the sectors on the track received in step 310 should be replicated for the background replication process (step 314). To do so, in this exemplary embodiment, control logic 108 determines whether any of these sectors are located in origin volume 110 and have not yet been copied to target volume 112.

Responsive to determining that one or more sectors on the track should be replicated (yes branch, step 314), control logic 108 sends the sectors to target hard disk drive 118 to be written to target volume 112 (step 316).

Accordingly, in this exemplary embodiment, control logic 108 is utilized to reduce the seek delay that is experienced when a request for data coincides with data that needs to be replicated during a background replication process. Here, sectors of data that may need to be replicated to target volume 112 are read and sent to control logic 108 by copying all data sectors on the track on which the requested data sector is located, which avoids additional seek delays and can increase background replication performance. This embodiment also has the unique ability to replicate an entire track during the course of single read. Increases in rotational latency (i.e., time delays associated with a full platter rotation to read the entire track) are typically negligible due to high rotational speeds of the platters.

In the embodiment discussed in FIG. 2, the transfer of sectors from disk buffer 106 to target volume 112 can be performed concurrently while the magnetic head seeks for a sector located on a different track than the previous track discussed in step 206. The dedicated bandwidth between origin hard disk drive 102 and target hard disk drive 118 allows for the data (i.e., sectors) to be transferred simultaneously between origin volume 110 and target volume 112 rather than the transfer of data being idle as the magnetic head seeks for sectors located on the different track. To further utilize disk buffer 106, a redirection of a READ request from origin volume 110 and target volume 112 can occur by synchronizing origin volume 110 and target volume 112. This allows for the determination step 212 to go directly to step 214 since the synchronization automatically allows for the sectors to be replicated to target volume 112.

Figure 4:
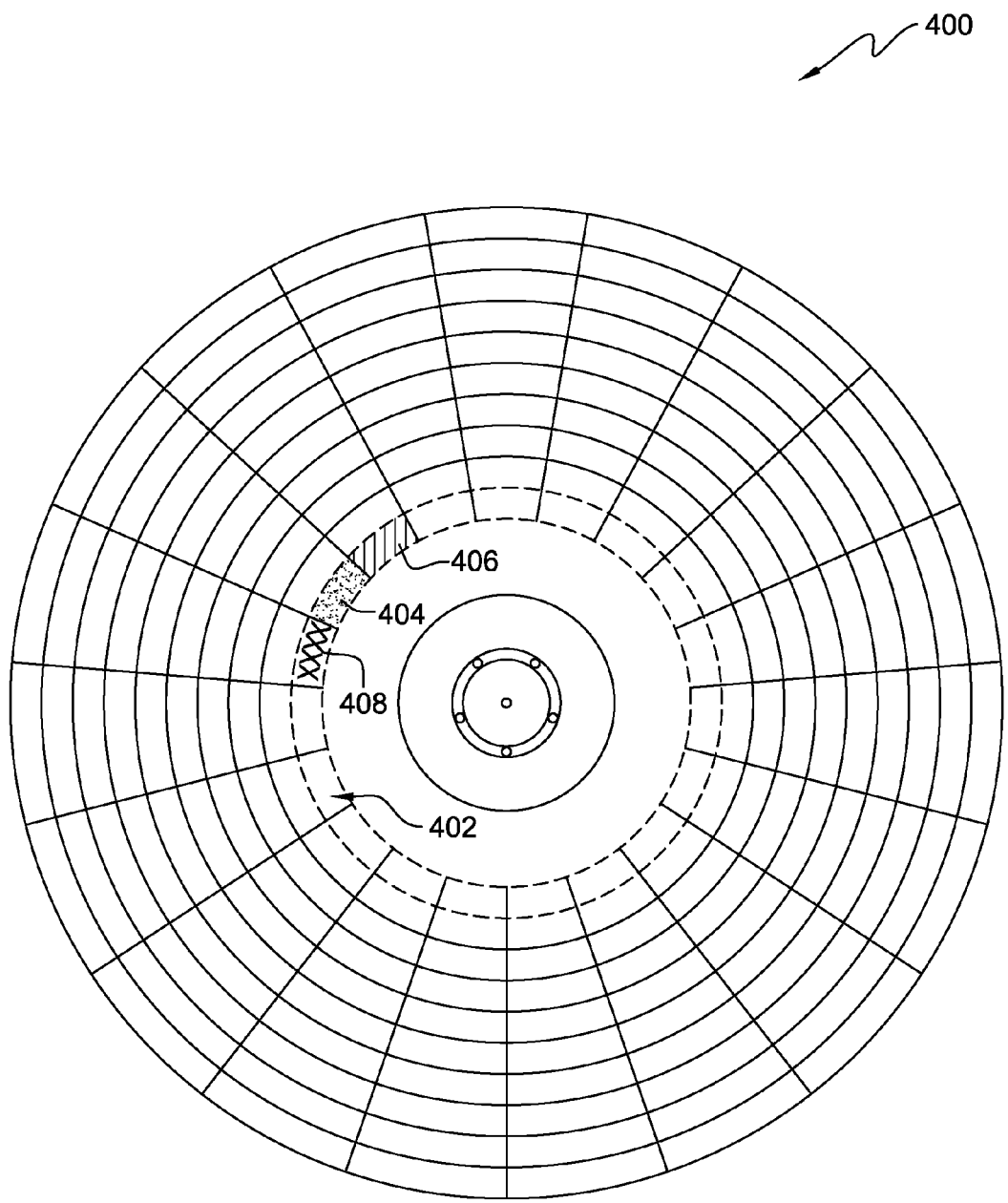
FIG. 4 is a diagram of a platter illustrating a hypothetical scenario in which an accelerated background replication process is performed in accordance with the control logic of FIG. 2.

FIG. 4 is a diagram of the surface of a platter illustrating a hypothetical scenario in which an accelerated background replication process is performed in accordance with the embodiment of FIG. 2. Platter 400 can be, for example, one of several platters within origin hard disk drive 102. Platter 400 includes ten tracks, where track 402 represents the innermost track. In this example, sectors 404, 406 and 408 on track 402 are located in origin volume 110. Sector 404 represents the sector being requested by application 116, sector 406 represents the sector preceding the requested sector and sector 408 represents the subsequent sector after the requested sector. As previously mentioned in the discussion of FIG. 2, sector 406 and sector 408 are read to ensure all of the requested data on sector 404 is obtained.

Sectors 404, 406 and 408 are read and stored in disk buffer 106. Control logic 108 receives and sends the requested sector 404 to application 116 to fulfill the read request. Control logic 108 then determines whether sectors 404, 406 and 408 should be replicated for the background replication process. Responsive to determining sectors 404, 406, and 408 should be replicated, control logic 108 reads sectors 404, 406, and 408 from disk buffer 106 and sends them to target hard disk drive 118 to be written to target volume 112 (not shown in FIG. 4).

Figure 5:
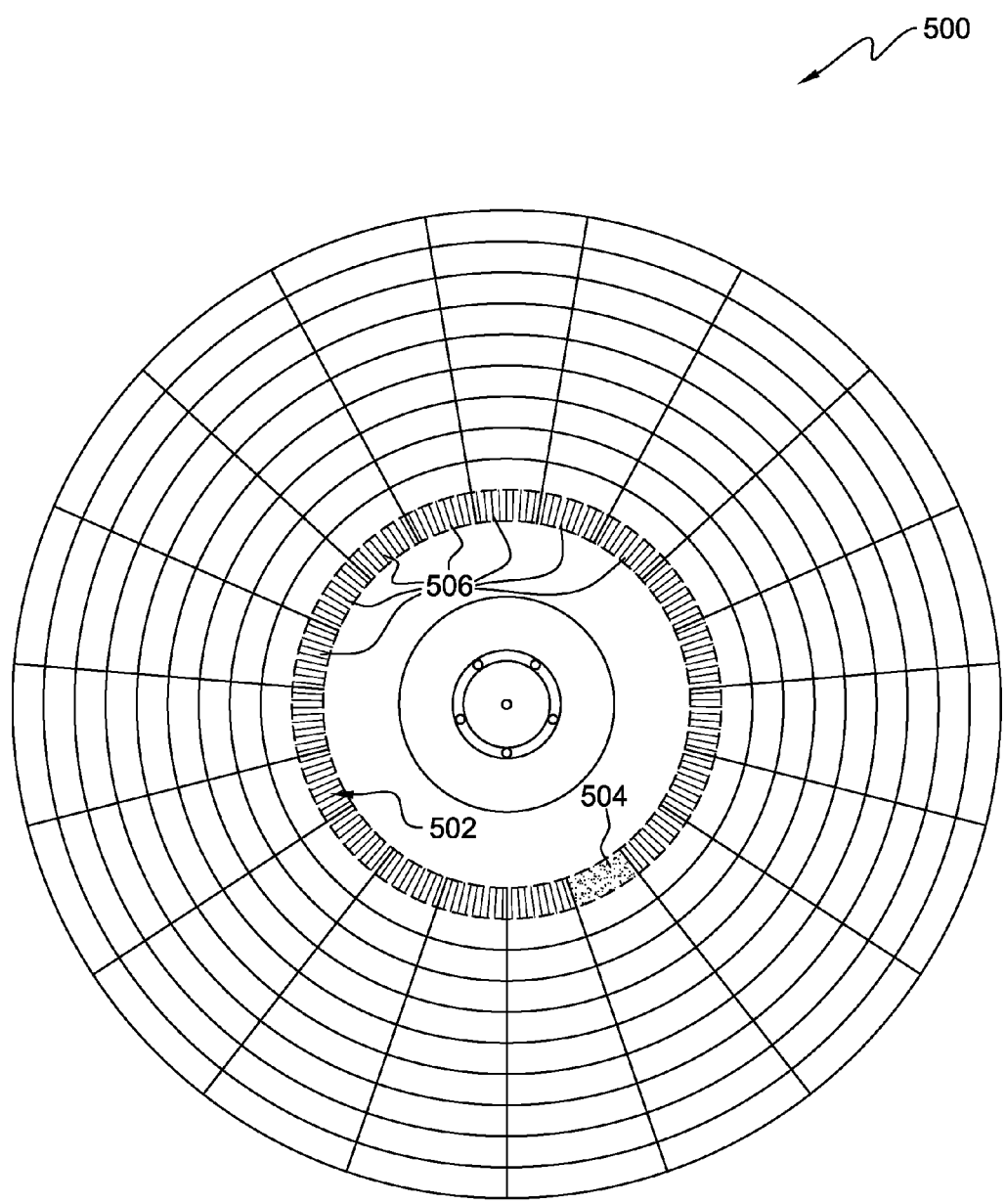
FIG. 5 is a diagram of a platter illustrating a hypothetical scenario in which an accelerated background replication process is performed in accordance with the control logic of FIG. 3.

FIG. 5 is a diagram of the surface of a platter illustrating a hypothetical scenario in which an accelerated background replication process is performed in accordance with the embodiment of FIG. 3. Platter 500 can be, for example, one of several platters within origin hard disk drive 102. Platter 500 includes ten tracks, where track 502 represents the innermost track. In this example, origin volume 110 includes all sectors on track 502.

A READ request by application 116 for data on sector 504 is made while a background replication process is being performed. Control logic 108 converts the request for data on sector 504 to include all surrounding sectors which are located on track 502 (i.e., sectors 506). Control logic 108 instructs origin hard disk drive 102 to read all sectors on track 502. Upon receiving all sectors on track 502, control logic 108 sends the requested sector 504 to application 116 to fulfill the READ request. Control logic 108 then determines if one or more of the sectors on track 502 should be replicated for the background replication process. Responsive to determining that one or more of the sectors should be replicated, control logic 108 sends the sectors to target hard disk drive 118 to be written to target volume 112 (not shown in FIG. 5).

While embodiments of the present invention are discussed with respect to hard disk drives, a person of ordinary skill in the art will recognize that other embodiments of the present invention may be applied to any storage device capable of seeking information on separate tracks. Any storage device with a disk buffer can eliminate the seek delays experienced by having to seek to the same track twice to fulfill a background replication process and an application I/O request.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for replicating data from a first volume to a second volume, the method comprising:
   receiving a first data request comprising a request for data on at least a first sector on a first track of a storage device, wherein the first sector is part of a first volume;
   reading data requested in the first data request, and reading at least a second sector of the first track, in addition to data requested in the first data request;
   determining whether the second sector should be replicated to a second volume; and
   in response to determining that the second sector should be replicated to the second volume, writing the second sector to the second volume.

2. The method of claim 1, wherein writing the second sector to the second volume comprises:
   reading the second sector from a disk buffer of the storage device; and
   writing the second sector to the second volume.

3. The method of claim 2, wherein said determining whether the second sector should be replicated to the second volume comprises:
   subsequent to reading the data requested in the first data request, notifying a replication process that the first sector on the first track has been read;
   determining, by the replication process, that at least one sector preceding or subsequent to the first sector on the first track has not been replicated to the second volume, wherein the at least one sector includes the second sector; and
   requesting at least the second sector, of the at least one sector, from the disk buffer.

4. The method of claim 1, wherein the second volume is stored on a plurality of hard disk drives in at least one remote storage system, and the first data request comprises an application data request.

5. The method of claim 1, wherein the first volume is stored on a plurality of hard disk drives in an array of hard disk drives.

6. The method of claim 1, further comprising:
subsequent to reading data requested in the first data request, and reading at least the second sector of the first track;
seeking a third sector containing data requested by an application, wherein the seeking occurs at least partially in parallel with said writing the second sector to the second volume.

7. The method of claim 1, wherein the method of replicating is a background replication process, further comprising:
analyzing a rate of data transferred between the first and second volume during a replication of data from the first volume to the second volume; and
in response to determining that the rate of data transferred is above a specified threshold, sequentially replicating additional sectors from the first volume to the second volume.

8. The method of claim 1, wherein the method of replicating is a background replication process, further comprising:
analyzing a rate of data transferred between the first volume and an application during fulfillment of the first data request, wherein the first data request is sent to the application; and
in response to determining that the rate of data transferred is below a specified threshold, sequentially replicating additional sectors from the first volume to the second volume.

9. The method of claim 1, further comprising:
converting the first data request to include all sectors that are located on the first track based on known geometry of the first volume available via one or more SCSI (small computer system interface) commands.

10. A computer program product for replicating data from a first volume to a second volume, the computer program product comprising:
one or more computer-readable storage media and program instructions stored in the one or more computer-readable storage media, the program instructions comprising:
program instructions to receive a first data request comprising a request for data on at least a first sector on a first track of a storage device, wherein the first sector is part of a first volume;
program instructions to read data requested in the first data request, and reading at least a second sector of the first track, in addition to data requested in the first data request;
program instructions to determine whether the second sector should be replicated to a second volume; and
in response to determining that the second sector should be replicated to the second volume, program instructions to write the second sector to the second volume;
wherein the computer-readable storage media is not a transitory signal.

11. The computer program product of claim 10, wherein writing the second sector to the second volume comprises program instructions, stored in the one or more computer-readable storage media, to:
read the second sector from a disk buffer of the storage device; and
write the second sector to the second volume.

12. The computer program product of claim 11, wherein said determining whether the second sector should be replicated to the second volume comprises program instructions, stored in the one or more computer-readable storage media, to:
subsequent to reading the data requested in the first data request, notify a replication process that the first sector on the first track has been read;
determine, by the replication process, that at least one sector preceding or subsequent to the first sector on the first track has not been replicated to the second volume, wherein the at least one sector includes the second sector; and
request at least the second sector, of the at least one sector, from the disk buffer.

13. The computer program product of claim 10, wherein the second volume is stored on a plurality of hard disk drives in at least one remote storage system, and the first data request comprises an application data request.

14. The computer program product of claim 10, further comprising program instructions, stored in the one or more computer-readable storage media, to:
subsequent to reading data requested in the first data request, read at least the second sector of the first track;
seek a third sector containing data requested by an application, wherein the seeking occurs at least partially in parallel with said writing the second sector to the second volume.

15. The computer program product of claim 10, wherein the method of replicating is a background replication process, further comprising program instructions, stored in the one or more computer-readable storage media, to:
analyze a rate of data transferred between the first and second volume during the replication of data from the first volume to the second volume; and
in response to determining that the rate of data transferred is above a specified threshold, sequentially replicate additional sectors from the first volume to the second volume.

16. The computer program product of claim 10, wherein the method of replicating is a background replication process, further comprising program instructions, stored in the one or more computer-readable storage media, to:
analyze a rate of data transferred between the first volume and an application during fulfillment of the first data request, wherein the first data request is sent to the application; and
in response to determining that the rate of data transferred is below a specified threshold, sequentially replicate additional sectors from the first volume to the second volume.

17. The computer program product of claim 10, further comprising program instructions, stored in the one or more computer-readable storage media, to:
convert the first data request to include all sectors that are located on the first track based on known geometry of the first volume available via one or more SCSI (small computer system interface) commands.

18. A computer system for replicating data from a first volume to a second volume, the computer system comprising:
one or more computer processors;
one or more computer-readable storage media;
control logic stored on the one or more computer-readable storage media for execution by at least one of the one or more computer processors, the control logic comprising:

control logic to receive a first data request comprising a request for data on at least a first sector on a first track of a storage device, wherein the first sector is part of a first volume;

control logic to read data requested in the first data request, and reading at least a second sector of the first track, in addition to data requested in the first data request;

control logic to determine whether the second sector should be replicated to a second volume; and in response to determining that the second sector should be replicated to the second volume, control logic to write the second sector to the second volume.

19. The computer system of claim 18, wherein writing the second sector to the second volume comprises control logic, stored on the one or more computer-readable storage media, to:

read the second sector from a disk buffer of the storage device; and write the second sector to the second volume.

20. The computer system of claim 19, wherein said determining whether the second sector should be replicated to the second volume comprises control logic, stored on the one or more computer-readable storage media, to:

subsequent to reading the data requested in the first data request, notifying a replication process that the first sector on the first track has been read;

determine, by the replication process, that at least one sector preceding or subsequent to the first sector on the first track has not been replicated to the second volume, wherein the at least one sector includes the second sector; and request at least the second sector, of the at least one sector, from the disk buffer.

21. The computer system of claim 18, wherein the second volume is stored on a plurality of hard disk drives in at least one remote storage system, and the first data request comprises an application data request.

22. The computer system of claim 18, further comprising method, stored on the one or more computer-readable storage media, to:

subsequent to reading data requested in the first data request, and reading at least the second sector of the first track;

seek a third sector containing data requested by an application, wherein the seeking occurs at least partially in parallel with said writing the second sector to the second volume.

23. The computer system of claim 18, wherein the method of replicating is a background replication process, further comprising control logic, stored on the one or more computer-readable storage media, to:

analyze a rate of data transferred between the first and second volume during the replication of data from the first volume to the second volume; and in response to determining that the rate of data transferred is above a specified threshold, sequentially replicate additional sectors from the first volume to the second volume.

24. The computer system of claim 18, wherein the method of replicating is a background replication process, further comprising control logic, stored on the one or more computer-readable storage media, to:

analyze a rate of data transferred between the first volume and an application during fulfillment of the first data request, wherein the first data request is sent to the application; and in response to determining that the rate of data transferred is below a specified threshold, sequentially replicate additional sectors from the first volume to the second volume.

25. The computer system of claim 18, further comprising control logic, stored on the one or more computer-readable storage media, to:

convert the first data request to include all sectors that are located on the first track based on known geometry of the first volume available via one or more SCSI (small computer system interface) commands.

* * * * *